(12) United States Patent
Kato et al.

(10) Patent No.: US 7,788,030 B2
(45) Date of Patent: Aug. 31, 2010

(54) NAVIGATION SYSTEM

(75) Inventors: Seiji Kato, Toyota (JP); Takamitsu Suzuki, Okazaki (JP); Masanori Oumi, Gifu (JP); Nobuhiro Mizuno, Tokyo (JP); Kosuke Hara, Tokyo (JP); Hirotoshi Iwasaki, Tokyo (JP)

(73) Assignees: Denso Corporation, Kariya (JP); Denso IT Laboratory, Inc., Tokyo (JP)

( * ) Notice: Subject to any disclaimer, the term of this patent is extended or adjusted under 35 U.S.C. 154(b) by 929 days.

(21) Appl. No.: 11/472,277

(22) Filed: Jun. 22, 2006

(65) Prior Publication Data

US 2007/0005242 A1 Jan. 4, 2007

(30) Foreign Application Priority Data

Jul. 1, 2005 (JP) ............................. 2005-194102

(51) Int. Cl.
*G01C 21/00* (2006.01)
(52) U.S. Cl. ...................... 701/211; 340/988
(58) Field of Classification Search ............. 701/200, 701/201, 206–208, 213, 217, 116, 211; 340/988, 340/990, 995.1, 989; 342/457, 358
See application file for complete search history.

(56) References Cited

U.S. PATENT DOCUMENTS

| 6,125,323 | A * | 9/2000 | Nimura et al. ............. 701/207 |
| 6,618,669 | B2 * | 9/2003 | Ota et al. .................. 701/208 |
| 6,778,905 | B2 | 8/2004 | Horikami |
| 6,898,524 | B2 | 5/2005 | Horikami |
| 6,909,968 | B2 * | 6/2005 | Yokota .................... 701/211 |
| 2002/0059190 | A1 | 5/2002 | Ishizaki |
| 2002/0152021 | A1 | 10/2002 | Ota et al. |
| 2004/0128066 | A1 * | 7/2004 | Kudo et al. ............... 701/204 |
| 2004/0260457 | A1 | 12/2004 | Kawase et al. |

FOREIGN PATENT DOCUMENTS

| DE | 198 39 378 | 3/2000 |
| JP | A-07-083678 | 3/1995 |

(Continued)

OTHER PUBLICATIONS

Office Action dated Jul. 30, 2008 in corresponding German patent application No. 10 2006 029 814.4-54 (and English translation).

(Continued)

*Primary Examiner*—Dalena Tran
(74) *Attorney, Agent, or Firm*—Posz Law Group, PLC (57) ABSTRACT

A navigation system for providing a destination of a trip and for use in a vehicle includes a position detector for detecting a current position of the vehicle, a condition detector for detecting a combination of a plurality of predetermined vehicle conditions when the vehicle is stopping at a stop location, a first determination unit for determining that the stop location is one of a stop-by place of the trip and the destination of the trip based on the combination of the plurality of the predetermined vehicle conditions detected by the condition detector, a storage unit for storing at least the destination of the trip based on a determination result by the first determination unit and an information provision unit for providing destination information regarding the trip at least based on the destination stored in the storage unit.

27 Claims, 4 Drawing Sheets

FOREIGN PATENT DOCUMENTS

| | | |
|---|---|---|
| JP | A-08-075492 | 3/1996 |
| JP | A-10-030932 | 2/1998 |
| JP | A-10-260053 | 9/1998 |
| JP | A-11-037771 | 2/1999 |
| JP | A-11-149596 | 6/1999 |
| JP | A-11-153446 | 6/1999 |
| JP | A-2000-046576 | 2/2000 |
| JP | A-2001-050760 | 2/2001 |
| JP | A-2002-048571 | 2/2002 |
| JP | A-2002-181576 | 6/2002 |
| JP | A-2003-151080 | 5/2003 |
| JP | A-2003-207346 | 7/2003 |
| JP | A-2003-222527 | 8/2003 |
| JP | A-2004-191314 | 7/2004 |
| JP | A-2004-287807 | 10/2004 |
| JP | A-2004-355075 | 12/2004 |
| JP | A-2005-009993 | 1/2005 |
| JP | A-2006-053132 | 2/2006 |

OTHER PUBLICATIONS

Office Action mailed Feb. 2, 2010 from the Japan Patent Office in the corresponding Japanese patent application No. 2005-194102 (English translation enclosed).

Office Action issued on Mar. 15, 2010 by German Patent and Trademark Office in corresponding German Application No. 10 2006 029 814.4-54 (English translation enclosed).

* cited by examiner

NAVIGATION SYSTEM

CROSS REFERENCE TO RELATED APPLICATION

This application is based on and claims the benefit of priority of Japanese Patent Application No. 2005-194102 filed on Jul. 1, 2005, the disclosure of which is incorporated herein by reference.

FIELD OF THE INVENTION

The present invention generally relates to a navigation system for a vehicle.

BACKGROUND OF THE INVENTION

A navigation system for use in a vehicle conventionally determines a destination of a travel by detecting a length of stopping time at a certain place. For example, the navigation system disclosed in Japanese patent document JP-A-2001-50760 uses a stoppage detection unit for detecting a stoppage of the vehicle, and determines whether the time of the stoppage is longer than a predetermined time by using a control unit. The stoppage of the vehicle is recorded as a parking history in a SRAM memory with the attributes of stopping location and other information. In this manner, the destination of the travel can be selected from entries in the parking history by a user of the navigation system. The user can search and pick up the destination in the history by inputting a search condition or other attributes.

The navigation system disclosed in Japanese patent document JP-A-H11-153446 records an accumulative travel history including a start/end location of a travel, date and time of the travel, and a distance of the travel based on the detected vehicle condition. The navigation system searches the accumulative travel history for calculating statistics such as a travel destination distribution and a travel time distribution for the most frequented travel destination based on the date and time of the travel when the navigation system is turned on at the start of the travel. Then, the destination of the travel predicted by the navigation system with an estimated travel time is announced from the navigation system. In addition, the navigation system in this disclosure determines that the vehicle has reached the destination of the travel based on the assumption that an ignition key of the vehicle is pulled out from the ignition switch at the destination of the travel.

The navigation systems disclosed in the above-described patent documents determine that the vehicle has reached the destination of the travel by detecting the period of the stay or by detecting that the ignition key is pulled out. However, the user of the vehicle does not necessarily keep the vehicle for a period longer than the predetermined time nor pull out the ignition key from the ignition switch. For example, the user of the vehicle sometimes stops at a facility, a restaurant or other place on his/her way to the destination for various reasons such as taking a rest, having a meal or the like. In this case, the vehicle may stop at those places for a period longer than the predetermined time, or the user may pull out the ignition key from the ignition switch at those places.

The stop-by places on the way to the destination of the travel detected and determined based on the above-described assumptions may cause inconvenience for the user if the stop-by places are recorded as the destination of the travel for later use. That is, the destinations of the travel based on the accumulative travel history recorded by the navigation system may not provide "real" destinations because of the inaccuracy of the accumulated travel history.

SUMMARY OF THE INVENTION

In view of the above-described and other problems, the present disclosure provides a navigation system that provides destination information regarding a current trip in an accurate and convenient manner for a user.

The navigation system of the present disclosure includes a position detector for detecting a current position of a vehicle, a condition detector for detecting a combination of a plurality of predetermined vehicle conditions when the vehicle is stopping at a stop location of a trip, a first determination unit for determining that the stop location is one of a stop-by place of the trip and the destination of the trip based on the combination of the plurality of the predetermined vehicle conditions detected by the condition detector, a storage unit for storing at least the destination of the trip based on a determination result by the first determination unit and an information provision unit for providing destination information regarding the trip at least based on the destination previously stored in the storage unit.

The navigation system of the present disclosure determines whether the vehicle is stopping at the destination of a trip or is stopping at a stopover place on its way to the destination based on plural vehicle conditions detected by the system. Therefore, the destination to be stored in the storage unit has an increased probability of a true destination of the trip, and the determination of the navigation system regarding the destination information provided for the user based on destination entries in the storage unit has an improved accuracy.

In another aspect of the present disclosure, the navigation system takes the following conditions into consideration for determining that the stop location of the vehicle is the destination of the trip. That is, the navigation system detects that the operation condition of a parking brake, an ON/OFF condition of an accessory switch, a stopping time of at the stop location, an open/close condition of vehicle doors and an increase/decrease of occupants of the vehicle. In this manner, the destination of the trip is highly accurately determined by the navigation system. For example, the condition of the vehicle stopping at the stop location with its parking brake not used and the accessory switch turned on indicates that the vehicle is highly possibly stopping at the stop-by place of the trip, and the vehicle condition with its parking brake set and the accessory switch turned off indicates that the vehicle is highly possibly stopping at the destination of the trip.

In yet another aspect of the present disclosure, a criterion for determining the destination is changed depending on a facility type at the proximity of the stop location. This is because the time required for a business at the stop location may vary depending on the type of the facility.

In still yet another aspect of the present disclosure, the navigation system includes a timer unit for measuring a time of stopping at a stop location in a round trip that starts and ends at a same place, and a first determination unit for distinguishing the stop location that has a longest stopping time in the round trip from other stop locations in the round trip and determining the distinguished stop location as the destination of the round trip when the vehicle is stopping at a plurality of the stop locations in the round trip as well as the storage unit and the information provision unit.

The navigation system of the present disclosure usually used for guiding the user to and back from the destination of the round trip stating at a home of the user. Further, the user usually visits a same destination for a number of times and stays there for longer time compared to the stop-by places on the way to the destination. Therefore, the navigation system determines that the stop location having the longest stopping time is the destination of the trip based on the assumption that the destination of the trip has longer stopping time than the stop-by places for improved accuracy of information provision.

In still yet another aspect of the disclosure, the navigation system determines that the stop location is the destination by calculating a ratio of stopping time to a total round trip time to and from the destination. In this manner, the destination of the round trip determined by the navigation system has an increased accuracy for use in the information provision to the user.

In still yet another aspect of the disclosure, the navigation system records the number of visit to each of the destination in the storage unit. In this manner, the destination information is associated with statistics of visits by the user.

In still yet another aspect of the disclosure, the navigation system considers the accuracy of the current position detected by the detection unit for determining position of the stop location. In this manner, positional errors of the detection unit is compensated.

In still yet another aspect of the disclosure, the navigation system considers additional conditions such as a time of stopping, a geographical feature of the stop location, a facility on the stop location and the like. In this manner, the accuracy of destination determination is improved.

In still yet another aspect of the disclosure, the navigation system measures the time of stopping at every stop location and determines that the stop location having the longest stopping time is the start point of the trip based on the statistics of the stopping time. In this manner, the location of parking space at a user's home or the like is accurately determined.

In still yet another aspect of the disclosure, the navigation system takes the time of the current trip into account for providing the destination information of the trip. That is, the time of the current trip is considered in terms of the time of the day, the day of the week, the date of the month, the season in the year or the like. In this manner, the accuracy of the destination information of the current trip is improved. The destination information determined or estimated in the above-described manner is presented to the user for improved usability of the navigation system. That is, user's convenience is improved when the estimated destinations of the current trip are automatically provided for the user because the user does not have to input the destination of the trip. The user has only to select or affirm the presented destination for receiving the route guidance to the destination from the navigation system.

In still yet another aspect of the disclosure, the navigation system records and uses the stop-by places in addition to the destinations for improved usability. The position of the stop-by places may be determined in the same manner as those of the destinations. That is, the accuracy of the detection unit, the time of stopping, the geographical feature, the facility on the stop location are considered for determination. In this manner, the stop-by places stored in the storage unit have an improved accuracy, and the number of visit to the stop-by place recorded in the storage unit further improves the accuracy of information provision based on the statistics.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Embodiments of the present disclosure are described with reference to the drawings. Like parts have like numbers in each of the embodiments.

First Embodiment

Figure 1:
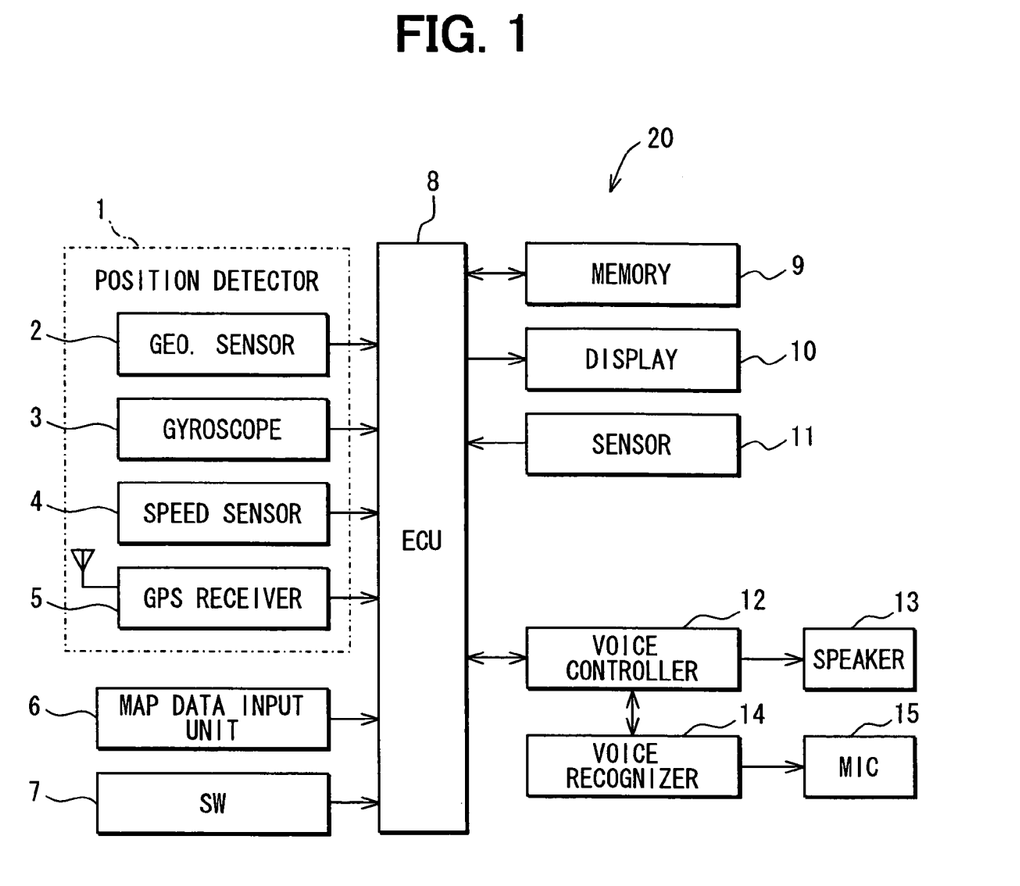
FIG. 1 shows a block diagram of a car navigation system in a first embodiment of the present disclosure.

FIG. 1 shows a block diagram of a car navigation system 20 in a first embodiment of the present disclosure. The navigation system 20 includes a position detector 1, a map data input unit 6, operation switches 7, an external memory 9, a display 10, various sensors 11, a voice controller 12, a speaker 13, a voice recognizer 14, the microphone 15 and a navigation ECU 8. The above-described components will be further described in detail.

The position detector 1 includes a plurality of well-known type sensors such as a geomagnetism sensor 2, a gyroscope 3, a distance sensor 4, and a Global Positioning System (GPS) receiver 5. These sensors are complementarily used with each other for interactive error compensation, because of respectively different natures of the error. These sensors may selectively be used based on the accuracy of the output, and a steering rotation sensor, a speed sensor or the like (not shown in the figure) may additionally be utilized.

The map data input unit 6 is used to input map data such as road data comprising node data and link data, index data, background drawing data or the like into the navigation ECU 8. These data are provided in various kinds of memory media such as a CD-ROM, a DVD-ROM, a hard disk or the like.

Next, links and nodes in the road data are described. Links and nodes are defined as geometrical elements with two points attached on both ends of the elements, and the node corresponds to a crossing, a branch point or the like of a road. In other words, roads in the real world are geometrically reflected by and mathematically represented as a combination of the link data and node data in the map data. The node data of each node for defining a crossing/branching point of the road includes a node ID, node coordinates (e.g., latitude and longitude), a node name, connecting link IDs for specifying all of the links that share the node as an end point, and node attributes such as intersection type information, traffic signal setup information, traffic regulation information and the like regarding the node. The link data of each road element includes a link ID, a link length, coordinates (e.g., latitude and longitude) of nodes on both ends of the link, i.e., a start point and an end point, a road type (an interstate expressway, a state road, a local road, or the like), a road width, the number of lanes in the road, a travel time for the link, a speed limit of the link and the like. The node data and the link data are used to calculate a navigation route from the start point to the destination of a trip by using a Dijikstra method, to draw a road image on the map or to provide other functions of the navigation system 20.

The map data includes information on facilities of various kinds. The facility information in the map data includes a location of the facility in association with the map data, an address, a telephone number, a facility type and the like. The facility information is used for destination setting or stop-by place setting.

The operation switches 7 are, for example, disposed as touch switches or mechanical switches on the display 10, and are used for inputting various kinds of instructions.

The external memory 9 is a memory medium with read/write capability for storing/retrieving information such as text data, image data and the like. The external memory 9 in the present embodiment is used to store the stop location of the vehicle as one of the destination of the trip or the stop-by place of the trip based on the condition of the vehicle in the stop location. The stop location information is stored in the external memory 9 with the time information of stopping such as the time of the day, the day of the week, the date of the month, the season of the year or the like. Further, the weather information from external resources may be acquired through communication network and stored in the external memory 9 with the information on the destination or the stop-by place. Furthermore, the information on the user, the driver or the occupants of the navigation system 20/vehicle may be stored in the same manner. The stored information in association with the destination and/or the stop-by place is used to improve the accuracy of the information provision regarding the current trip. That is, the destination and/or the stop-by place in the current trip is accurately estimated by the navigation system 20 based on the stored information.

The display 10 is, for example, a liquid crystal display or the like, and displays a position mark of the vehicle derived from the position detector 1 at a current position on a map by retrieving the map data of a corresponding area from the map data input unit 6.

The sensors 11 of various types used to detect the vehicle conditions includes a parking brake sensor for detecting operation conditions of the parking brake, an accessory switch sensor for detecting an ON/OFF condition of the accessory switch (an ignition switch), a door sensor for detecting an open/close condition of vehicle doors, a seat sensor for detecting an occupant on each of the seats in the vehicle. The navigation ECU 8 includes a clock with a calendar function, and the clock is used for measuring stopping time when the vehicle is stopping at the stop location. The clock is also used to provide the time information when the stop location is determined to be stored as the destination or the stop-by place.

The voice controller 12 is coupled with the voice recognizer 14 that recognizes voice signal from the microphone 15. The voice signal recognized by the voice recognizer 14 is sent to the navigation ECU 8 as an operation signal. The voice controller 12 controls output of a warning sound or a synthesized voice from the speaker 13. For example, the synthesized voice from the speaker 13 may provide information regarding an estimated destination of the current trip or a traveling direction to be followed by the driver.

The information provision regarding the destination of the trip by the navigation system 20 and the route navigation after setting the destination are described with reference to the drawings.

Figure 2:
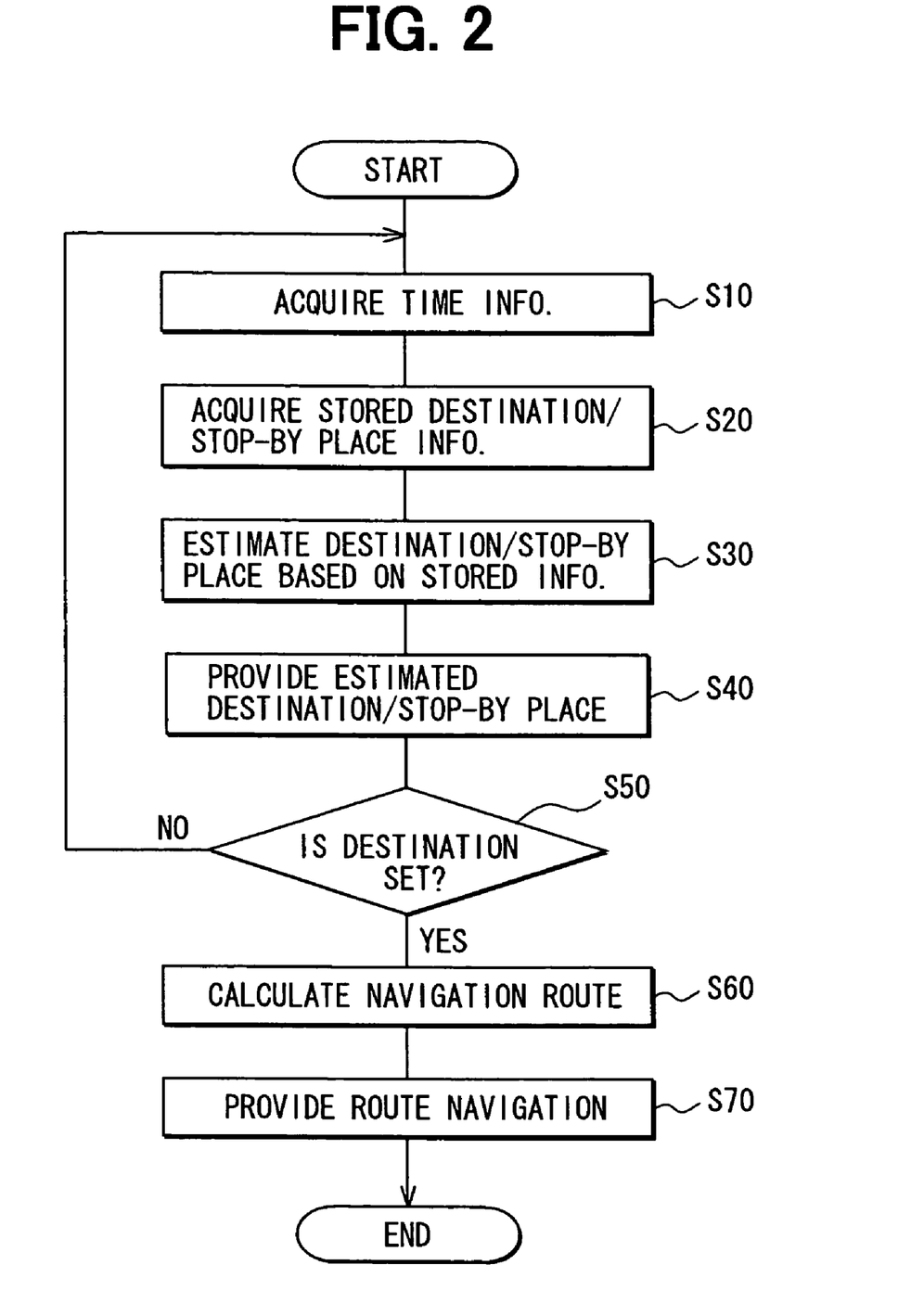
FIG. 2 shows a flowchart of a process for destination information provision and route navigation by the navigation system.

FIG. 2 shows a flowchart of a process for destination information provision and route navigation by the navigation system 20.

In step S10, the process controls the clock in the navigation ECU to provide the time information of the current trip in terms of the time of the day, the day of the week, date of the month and the season of the year. In step S20, the process controls the external memory 9 to provide information regarding the destinations and the stop-by places.

In step S30, the process estimates the destination and the stop-by place of the current trip based on the time information and the stored information on the destinations and the stop-by places.

The estimation of the destinations and stop-by places is conducted, for example, by analyzing the resemblance of the time information associated with the stored destinations and stop-by places. The result of the analysis may include only one estimated destination/stop-by place, or may include a list of estimated destinations/stop-by places. The time information may be multi-dimensionally analyzed if it includes multiple attributes/parameters. The time information may also be analyzed by using prioritized parameters. That is, a specific parameter of the time information may have higher priority over other parameters.

The destination and the stop-by place of the current trip may be selected and determined from all of the destinations and stop-by places stored in the external memory 9. In this case, the destinations and the stop-by places may be categorized into several groups based on, for example, the distance from the current position of the vehicle in order to avoid an overwhelming list of destination/stop-by place entries. The list of the destination/stop-by place may be sorted and rearranged by using the number of visits to each of the destinations/stop-by places.

Further, the list of the estimated destination/stop-by place may be organized by using the weather information, driver information, occupants information, and the like. In this manner, the resemblance of user conditions at the time of previous visit may be considered for improved accuracy of estimation. The estimation of the destination and the stop-by place may preferably be conducted by using an inference engine such as Bayesian network or the like.

In step S40, the process provides the destination and/or the stop-by place by using the voice from the speaker 13 or an image on the display 10.

In step S50, the process receives input from the user for determining the destination and/or the stop-by place. For example, the process receives the user input that specifies one of the destinations listed on the display 10. The process proceeds to step S60 when the user specifies the destination (step S50:YES). Determination of the stop-by place is optional. The process returns to step S10 when the destination is not set in step S50. The process may be terminated when the destination setting is not complete after multiple chances of destination setting provided for the user from the navigation system 20.

In step S60, the process calculates and determines a navigation route from the current position toward the selected destination. The navigation route may includes the stop-by place(s) en route to the selected destination when the stop-by place(s) is/are selected.

In step S70, the process provides route navigation toward the selected destination based on the navigation route calculated in step S60. The route navigation includes navigation instruction on the road map in the display 10 and guidance voice for turn instructions at an intersection.

The user of the navigation system 20 benefits from the process of destination/stop-by place estimation described above because of the provision of the estimated destinations/stop-by places based on an automated resemblance analysis or the like. The estimation of the destination may be based on the most probable stop-by place specified by the user. That is, the destination may be determined based on the user selection of the stop-by place that is associated with the specific destination.

Figure 3:
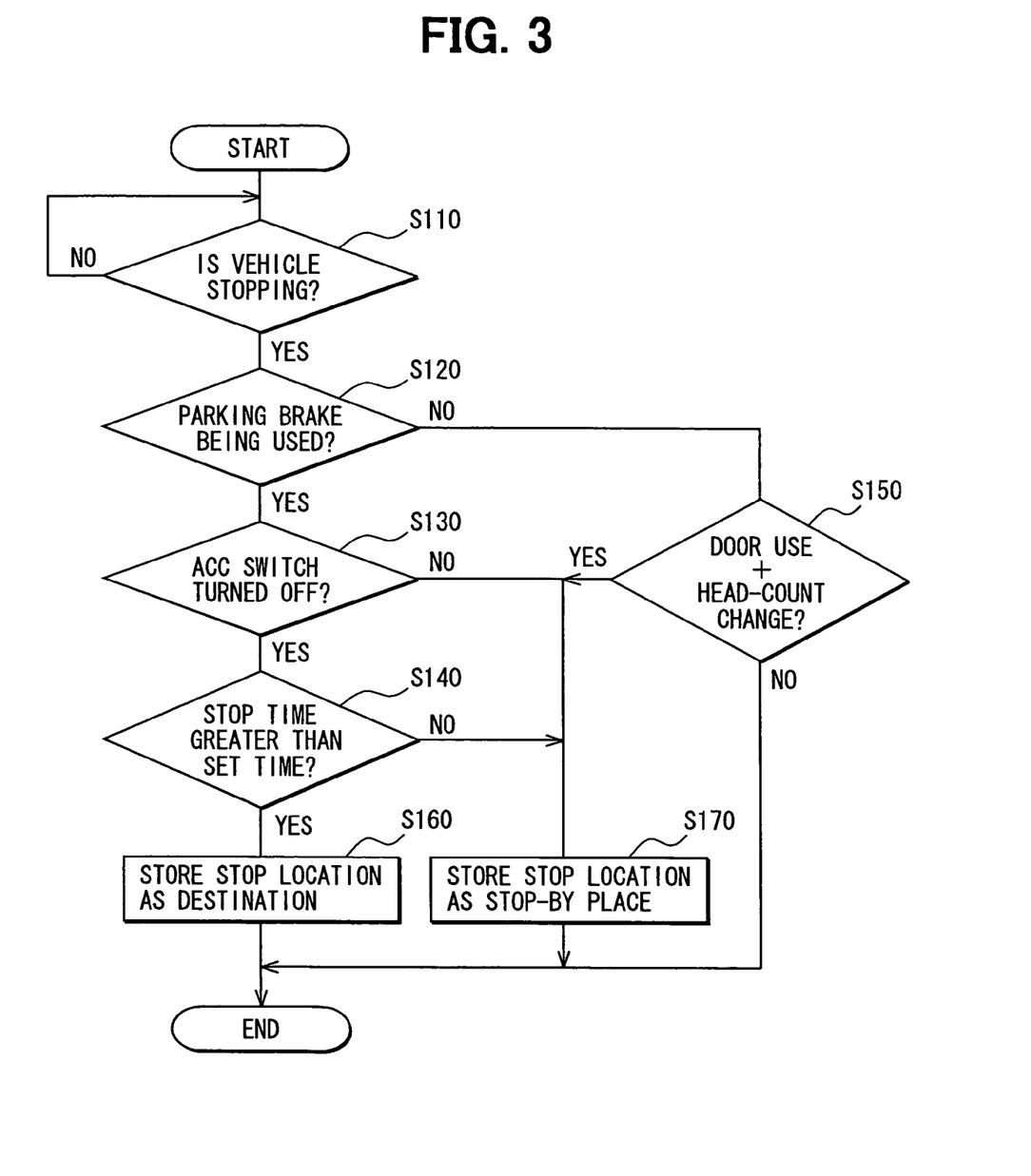
FIG. 3 shows a flowchart of a process for determining a destination/stop-by place in the first embodiment.

The destination information provided above is carefully arranged and prepared for the sake of the accuracy and the user convenience. That is, the information stored in the external memory 9 is selectively analyzed and distinguished in the following manner. FIG. 3 shows a flowchart for a process FIG. 3 shows a flowchart of a process for determining a destination/stop-by place in the first embodiment.

In step S110, the process of the destination/stop-by place determination detects whether the vehicle is stopping based on, for example, a vehicle speed detected by the speed sensor 4. The process proceeds to step S120 when the vehicle is stopping (step S110:YES). The process repeats step S110 when the vehicle is not stopping (step S110:NO).

In step S120, the process determines whether the parking brake is being used. The process proceeds to step S150 when the parking brake is not in use (step S120:NO). The process proceeds to step S130 when the parking brake is in use. That is, the process assumes that the vehicle is stopping either at the destination of the trip or the stop-by place of the trip.

In step S130, the process determines whether the accessory (ACC) switch is turned from on to off. The process proceeds to step S170 when the accessory switch is not turned off (step S130:NO) based on the assumption that the vehicle is stopping temporarily at the stop location without stopping the engine. The process proceeds to step S140 when the accessory switch is determined to be turned off (step S130:YES).

In step S140, the process determines whether the stopping time is longer than a predetermined time. The process proceeds to step S170 when the stopping time is not longer than the predetermined time (step S140:NO) based on the assumption that the vehicle is stopping at the stop location for a shot time. The process proceeds to step S160 when the stopping time is equal to or longer than the predetermined time.

In step S150, the process determines whether the door of the vehicle is used and change in the number of the occupants is found by using the door sensor and the seat sensor. The process proceeds to step S170 when the door is used and the number of the occupants changes (step S150:YES) based on the assumption that the vehicle is stopping for pick-up or drop-off at the stop-by place. The process concludes when the door is not used or change in the occupants number is not found (step S150:NO) based on the assumption that the stop location is neither of the destination nor the stop-by place.

In step S160, the process determines that the stop location is the destination of the trip and stores the location information in the external memory 9.

In step S170, the process determines that the stop location is the stop-by place of the trip and stores the location information in the external memory 9.

The process in steps S160 and S170 stores the location information after determining that the stop location is identical with the entries of the destinations/stop-by places in the external memory 9. The location information is preferably stored in the external memory 9 with the number of visits to each of the destinations and the stop-by places when the stop location is identified as one of the entries of the destinations or the stop-by places.

The identity of the stop location with one of the entries in the external memory 9 is determined based on the following attributes of the location information. That is, the accuracy of the current vehicle position detected by the position detector 1, the distance from the location of the stored destination/stop-by place in the external memory 9, and the time information such as the time of the day, the day of the week or the like are preferably taken into consideration. Further, the identity may preferably be determined based on the geographical feature of the stop location and/or the facility on the stop location. For example, when the distance of the stop location from the destination or the stop-by place stored in the external memory 9 is within the range of errors of the position detector 1, the vehicle may be determined to be stopping at the destination or the stop-by place. In this case, when the time information of the stored destination or stop-by place resembles to the time information of the current stopping, the current stop location has increased probability to be identical with one of the stored destinations/stop-by places in the external memory 9. The location information regarding the geographical feature and/or the facility serves for the same purpose. For example, two closely located places with a cliff interposed therebetween can be determined to be different based on the geographical feature information, and the facility such as a toll road may be used to distinguish a parking areas located inside of the toll road from a closely located parking area on a local road. That is, the stop location may be multilaterally analyzed and distinguished based on the information associated with the destination/stop-by place entries for the improvement of estimation accuracy.

The navigation system 20 determines and provides information regarding the destination of the current travel and the stop-by places en route in the above-described manner for improved accuracy of estimation information provision. That is, the vehicle condition and the location information in association with the time information at the time of stopping on the stop location are used for precisely determining the resemblance of the stop location to one of the previously visited destinations or the stop-by places in the external memory 9, thereby enabling the navigation system 20 to accurately provide the destination information and/or the stop-by place information of the current trip.

Second Embodiment

A second embodiment of the present disclosure is described with reference to the drawings. Focus of the description is put on a difference between the first and the second embodiment. That is, only the process for determining the destination/stop-by place in the second embodiment is described in the present portion of the document.

Figure 4:
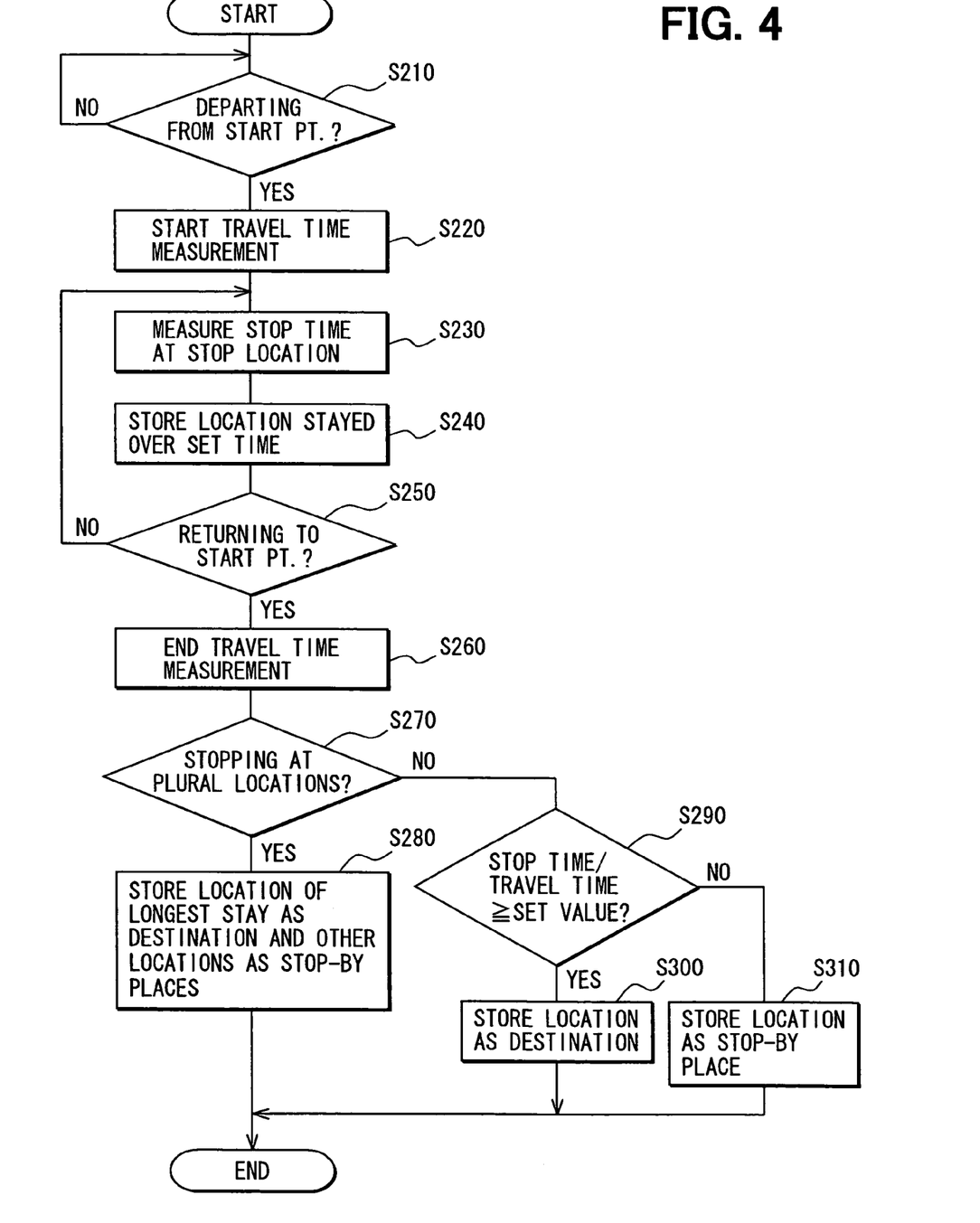
FIG. 4 shows a flowchart of a process for determining the destination/stop-by place in the second embodiment.

FIG. 4 shows a flowchart of a process for determining the destination/stop-by place in the second embodiment.

In step S210, the process for determining the destination and/or the stop-by place determines whether the vehicle has departed a start point of a current trip, e.g., a parking lot in a user's home. The process proceeds to step S220 when the departure of the vehicle is detected (step S210:YES). In this case, the start point may be a pre-registered place inputted by the user, or the start point may be statistically determined to be a place having the longest stop time based on records of the stop times measured at all stop locations. The process repeats step S210 while the vehicle is staying at the start point.

In step S220, the process starts travel time measurement for measuring a travel time. The process proceeds to step S230 after step S220.

In step S230, the process measures stop time at every stop location when the vehicle stops at the stop locations. The process proceeds to step S240 after step S230.

In step S240, the process stores the stop location at which the vehicle is stopping for a period equal to or longer than a predetermined time. The measured amount of the stopping time is also stored for statistics. The stopping time may be stored based on the conditions that the parking brake is used and the accessory switch is turned off as described in the first embodiment. The process proceeds to step S250 after step S240.

In step S250, the process determines whether the vehicle has returned to the start point. The process proceeds to step S260 when return of the vehicle is detected (step S250:YES). The process returns to step S230 until the vehicle returns to the start point (step S250:NO).

In step S260, the process terminates measurement of the travel time by the travel time. Thus, the travel time is defined to be a length of time between the start time and the end time of a round trip from the start point. The travel time may or may not include the stopping times at the stop locations in the round trip.

In step S270, the process determines whether the vehicle has stopped at plural stop locations. That is, in other words, whether the process has stored plural stop locations in step S240 is determined based on the stopping time greater than the predetermined length of time. The process proceeds to step S280 when the vehicle has stopped at more than one location (step S270:YES). The process proceeds to step S290 when the vehicle has stopped at only one location (step S270: NO).

In step S280, the process stores the stop location that has the longest stopping time as the destination of the trip and stores other stop locations as the stop-by place of the trip in the external memory 9. The determination of the destination is based on the assumption that the user of the vehicle visits a same specific place when the trip of the vehicle starts from a specific parking place or the like and ends at the same place. The determination also assumes that the user stays at the destination for the longest time in the trip. Further, in most cases, the stop locations en route can be classified as one destination and accompanying stop-by places. In this manner, the stop locations in the trip can be accurately determined as either the destination of the trip or the stop-by place of the trip.

In step S290, the process determines whether the ratio of the stopping time to the travel time is equal to or greater than a predetermined value. The process proceeds to step S300 when the ratio is determined to be equal to or greater than the predetermined value (step S290:YES). The process proceeds to step S310 when the ratio is smaller than the predetermined value (step S290:NO).

In step S300, the process stores the stop location determined in step S270 as the destination of the trip. The process concludes after step S300.

In step S310, the process stores the plural stop locations determined in step S270 as the stop-by places.

The determination in steps S300 based on a certain ratio of stopping time to the travel time at the only one stop location in the trip is derived from the assumption that the user stays at the destination of the trip for a longer period in comparison to the travel time to and from the destination. In other words, the ratio smaller than the predetermined value determines that the trip has had no destination. In this manner, the ratio of the stopping time and the travel time may be used as an accurate criterion for determining the destination of the trip.

Although the present disclosure has been fully described in connection with the preferred embodiment thereof with reference to the accompanying drawings, it is to be noted that various changes and modifications will become apparent to those skilled in the art.

For example, criteria for determining the destination and/or stop-by place may include other conditions such as traveling through a specific road, bridge, gate or the like, turning right/left for a predetermined number of times and/or ascending/descending to a predetermined altitude in the trip.

Such changes and modifications are to be understood as being within the scope of the present disclosure as defined by the appended claims.

What is claimed is:

1. A navigation system for use in a vehicle comprising:
a position detector configured to detect a current position of the vehicle;
a condition detector configured to detect a combination of a plurality of predetermined vehicle conditions when the vehicle is stopping at a stop location;
a first determination unit configured to determine which one of a stop-by place, at which the vehicle temporarily stops in the trip, and the destination of the trip the stop location is, based on the combination of the plurality of the predetermined vehicle conditions detected by the condition detector;
a storage unit configured to store at least the destination of the trip based on a determination result by the first determination unit, the stop location being stored in the storage unit as the destination in response to a determination of the first determination unit that the stop location is the destination, and the stop location being stored in the storage unit as the stop-by place in response to a determination of the first determination unit that the stop location is the stop-by place; and
an information provision unit configured to provide destination information regarding the trip at least based on the destination stored in the storage unit, and to provide information regarding the trip based on the stop-by place in distinction from the destination information,
wherein the first determination unit determines which one of the stop-by place of the trip and the destination of the trip the stop location is based on the combination of the plurality of the predetermined vehicle conditions including an operation condition of a parking brake, an ON/OFF condition of an accessory switch, a stopping time at the stop location, an open/close condition of a door, and an increase/decrease of a number of occupants in the vehicle.

2. The navigation system as in claim 1,
wherein the first determination unit adopts a variable criterion regarding the stopping time at the stop location based on a type of a facility existing in a proximity of the stop location.

3. The navigation system as in claim 1 further comprising:
a second determination unit configured to determine whether, when the stop location is determined as the destination of the trip by the first determination unit, at least one of destination entries already stored in the storage unit corresponds to the stop location,
wherein the storage unit stores a total number of visits in association with the at least one of destination entries in the storage unit based on the determination by the second determination unit that at least one of the destination entries already stored in the storage unit corresponds to the stop location.

4. The navigation system as in claim 3,
wherein the second determination unit determines whether the stop location of the vehicle is identical to one of the destination entries in the storage unit based on a distance of the stop location from the destination stored in the storage unit being within an accuracy of vehicle position detected by the position detector to compensate for positional errors of the position detector.

5. The navigation system as in claim 4,
wherein the second determination unit determines whether the stop location of the vehicle is identical to one of the destination entries in the storage unit based on at least one of additional conditions including a time condition of stopping of the vehicle at the stop location, a geographical feature of the stop location and a facility on the stop location.

6. The navigation system as in claim 1,
wherein the storage unit stores the destination entries in association with the time conditions of stopping of the vehicle at the destinations, and
the information provision unit provides the destination information regarding the trip based on a correlation between the time of a current trip of the vehicle and the time conditions in association with the destination in the storage unit.

7. The navigating system as in claim 6, wherein the time conditions include at least one of a time of a day, a day of a week, a date of a month, a season of a year.

8. The navigation system as in claim 1,
the information provision unit provides information on the stop-by place expected in the trip to the destination based on the stop-by place stored in the storage unit.

9. The navigation system as in claim 8 further comprising:
a third determination unit configured to determine whether the stop location determined as the stop-by place by the first determination unit is identical to one of stop-by place entries in the storage unit,
wherein the storage unit stores a total number of visits in association with the one of stop-by place entries in the storage unit based on the determination by the third determination unit when the stop location is identical to at least one of the stop-by place entries.

10. The navigation system as in claim 9,
wherein the third determination unit determines whether the stop location of the vehicle is identical to one of the stop-by place entries in the storage unit based on a distance of the stop location from the stop-by place stored in the storage unit being within an accuracy of vehicle position detected by the position detector to compensate for positional errors of the position detector.

11. The navigation system as in claim 10,
wherein the third determination unit determines whether the stop location of the vehicle is identical to one of the stop-by place entries in the storage unit based on at least one of additional conditions including a time condition of stopping of the vehicle at the stop location, a geographical feature of the stop location and a facility on the stop location.

12. The navigating system as in claim 1, wherein the storage unit is further configured to store the stop location with a determination result of one of the stop-by place and the destination in accordance with the determination of the first determination unit.

13. The navigating system as in claim 12, wherein the stop-by place is on a way to the destination.

14. The navigating system as in claim 13, wherein the destination and the stop-by-place are categorized into a plurality of groups based on a distance from the current position to each of the destination and the stop-by-place.

15. A navigation system for providing information on a destination of a round trip and for use in a vehicle comprising:
a position detector configured to detect a current position of the vehicle;
a timer unit configured to measure a time of stopping at a stop location in the round trip that starts and ends at a same place;
a first determination unit configured to determine which of plural stop locations has a longest stopping time in the round trip, to distinguish the stop location that has the longest stopping time in the round trip from other stop locations in the round trip and to determine the distinguished stop location as the destination of the round trip when the vehicle is stopping at a plurality of the stop locations in the round trip;
a storage unit configured to store at least the destination of the round trip based on a determination result by the first determination unit, the stop location being stored in the storage unit as the destination when the first determination unit determines the stop location to be the destination, and the stop location being stored in the storage unit as one of the other stop locations when the first determination unit determines the stop location to be one of the other stop locations; and
an information provision unit configured to provide destination information regarding the round trip at least based on the destination stored in the storage unit.

16. The navigation system as in claim 15, there being a single destination in the round trip, the other stop locations en route in the round trip being classified accompanying stop-by places.

17. A navigation system for providing information on a destination of a round trip and for use in a vehicle comprising:
a position detector configured to detect a current position of the vehicle;
a timer unit configured to measure a time of stopping at a stop location in the round trip that starts and ends at a same place;
a first determination unit configured to determine which one of the destination of the round trip and a stop-by place the stop location is in the round trip that includes only one stop location, wherein the first determination unit determines the stop location as the destination instead of the stop-by place on condition that a ratio between the time of stopping at the stop location to a total trip time is greater than a predetermined value when the vehicle has stopped at only one stop location in the round trip;
a storage unit configured to store at least the destination of the round trip based on a determination result by the first determination unit; and
an information provision unit configured to provide destination information regarding the round trip at least based on the destination stored in the storage unit.

18. A navigation system for providing information on a destination of a round trip and for use in a vehicle comprising:
a position detector configured to detect a current position of the vehicle;
a timer unit configured to measure a time of stopping at a stop location in the round trip that starts and ends at a same place;

a first determination unit configured to distinguish the stop location that has a longest stopping time in the round trip from other stop locations in the round trip and to determine the distinguished stop location as the destination of the round trip when the vehicle is stopping at a plurality of the stop locations in the round trip;

a storage unit configured to store at least the destination of the round trip based on a determination result by the first determination unit; and an information provision unit configured to provide destination information regarding the round trip at least based on the destination stored in the storage unit, wherein the timer unit measures the time of stopping of the vehicle at each of the stop locations respectively, and the timer unit determines that a certain stop location is a start point of the trip based on statistics that the certain stop location has the longest stopping time among the stop locations.

19. The navigation system as in claim 18 further comprising:

a second determination unit configured to determine whether the stop location determined as the destination of the trip by the first determination unit is identical to one of destination entries stored in the storage unit, wherein the storage unit stores a total number of visits in association with the one of destination entries in the storage unit based on the determination by the second determination unit when the stop location is identical to at least one of the destination entries in the storage unit.

20. The navigation system as in claim 19, wherein the second determination unit determines whether the stop location of the vehicle is identical to one of the destination entries in the storage unit based on a distance of the stop location from the destination stored in the storage unit being within an accuracy of vehicle position detected by the position detector to compensate for positional errors of the position detector.

21. The navigation system as in claim 20, wherein the second determination unit determines whether the stop location of the vehicle is identical to one of the destination entries in the storage unit based on at least one of additional conditions including a time condition of stopping of the vehicle at the stop location, a geographical feature of the stop location and a facility on the stop location.

22. A navigating system for a vehicle comprising:

a position detector configured to detect a current position of the vehicle;

a condition detector configured to detect a combination of a plurality of conditions of the vehicle when the vehicle is stopping at each of stop locations;

a first determination unit configured to determine which one of a stop-by place, at which the vehicle temporarily stops in the trip, and the destination of the trip each of the stop locations is, based on the combination of the conditions;

a storage unit configured to store the stop locations each associated with a determination result of one of the stop-by place and the destination; and an information provision unit configured to provide stop-by-place information regarding the trip based on the stop locations each associated with the stop-by-place, wherein the first determination unit determines which one of the stop-by place of the trip and the destination of the trip the stop location is based on the combination of the plurality of the predetermined vehicle conditions including an operation condition of a parking brake, an ON/OFF condition of an accessory switch, a stopping time at the stop location, an open/close condition of a door, and an increase/decrease of a number of occupants, in the vehicle.

23. The navigating system as in claim 22, wherein the information provision unit is configured to further provide destination information regarding the trip based on the stop locations each associated with the destination in distinction from the stop-by-place information.

24. The navigating system as in claim 22, wherein the information is related to only the stop locations each associated with the stop-by-place.

25. A navigation system for providing information on a destination of a trip and for use in a vehicle comprising:

a position detector configured to detect a current position of the vehicle;

a condition detector configured to detect a combination of a plurality of predetermined vehicle conditions when the vehicle is stopping at a stop location;

a first determination unit configured to determine which one of a stop-by place of the trip and the destination of the trip the stop location is, based on the combination of the plurality of the predetermined vehicle conditions detected by the condition detector;

a storage unit configured to store at least the destination of the trip based on a determination result by the first determination unit, the stop location being stored in the storage unit as the destination when the first determination unit determines the stop location to be the destination, and the stop location being stored in the storage unit as the stop-by place when the first determination unit determines the stop location to be the stop-by place;

an information provision unit configured to provide destination information regarding the trip at least based on the destination stored in the storage unit, and to provide information regarding the trip based on the stop-by place; and a second determination unit configured to determine whether, when the stop location is determined as the destination of the trip by the first determination unit at least one of destination entries already stored in the storage unit corresponds to the stop location, wherein the storage unit stores a total number of visits in association with the at least one of destination entries in the storage unit based on the determination by the second determination unit that at least one of the destination entries already stored in the storage unit corresponds to the stop location.

26. The navigation system as in claim 25, wherein the second determination unit determines whether the stop location of the vehicle is identical to one of the destination entries in the storage unit based on a distance of the stop location from the destination stored in the storage unit being within an accuracy of vehicle position detected by the position detector to compensate for positional errors of the position detector.

27. The navigation system as in claim 26, wherein the second determination unit determines whether the stop location of the vehicle is identical to one of the destination entries in the storage unit based on at least one of additional conditions including a time condition of stopping of the vehicle at the stop location, a geographical feature of the stop location and a facility on the stop location.

* * * * *